United States Patent [19]

Watanabe

[11] Patent Number: 5,588,136
[45] Date of Patent: Dec. 24, 1996

[54] MEMORY CONTROL METHOD AND APPARATUS THEREFOR

[75] Inventor: Kimio Watanabe, Kawasaki, Japan

[73] Assignee: Fujitsu Limited, Kanagawa, Japan

[21] Appl. No.: 279,857

[22] Filed: Jul. 26, 1994

[30] Foreign Application Priority Data

Jan. 11, 1994 [JP] Japan .................... 6-001209

[51] Int. Cl.⁶ ..................... G06F 11/00
[52] U.S. Cl. ................. 395/187; 395/163
[58] Field of Search ............. 395/486, 487, 395/460, 463, 436; 369/200, 246.12

[56] References Cited

U.S. PATENT DOCUMENTS

| | | | |
|---|---|---|---|
| 4,783,735 | 11/1988 | Miu et al. | 364/200 |
| 4,910,731 | 3/1990 | Sakurai et al. | 370/67 |
| 5,142,663 | 8/1992 | Janis et al. | 395/575 |

Primary Examiner—David K. Moore
Attorney, Agent, or Firm—Staas & Halsey

[57] ABSTRACT

A memory controlling apparatus is provided with: a record information memory, a vacant address controller for serially storing the address data which specifies the addresses where record information referred to has been stored in order of reference, supplying the address data in the order of storage, and designating the addresses for storing the record information on new events by the supplied address data; and a LRU (least recently used) unit for storing the address data; and a LRU unit for storing the address data which specifies the address of the memory at which record information is stored in the order of storage. When a new event occurs, a control unit obtains the address at which the oldest record information is stored from the LRU unit, if no address is designated by the vacant address controller, and stores the record information on the new event at the address obtained, while storing the record information on the new event at the designated address when the address is designated by the vacant address controller.

4 Claims, 16 Drawing Sheets

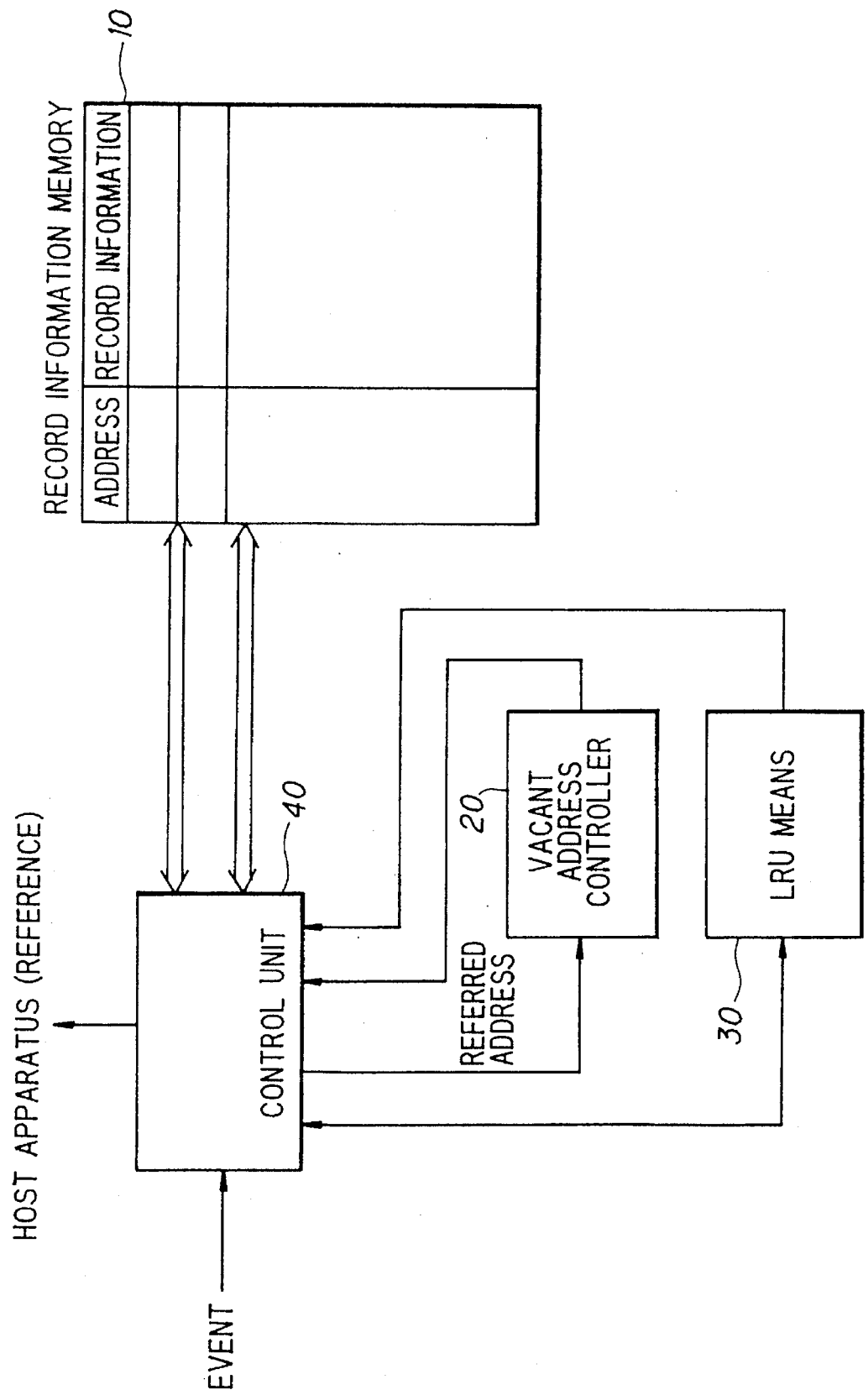

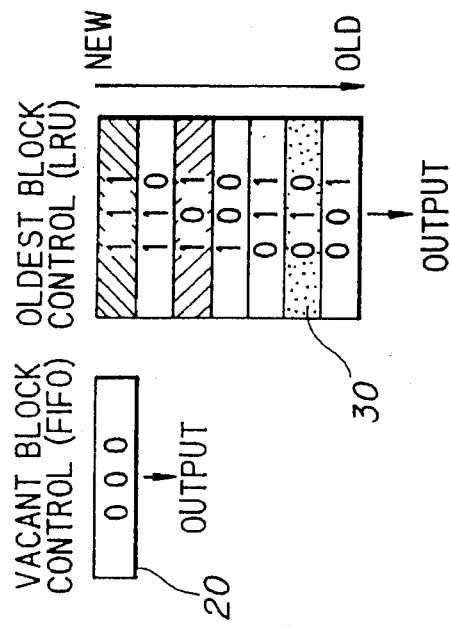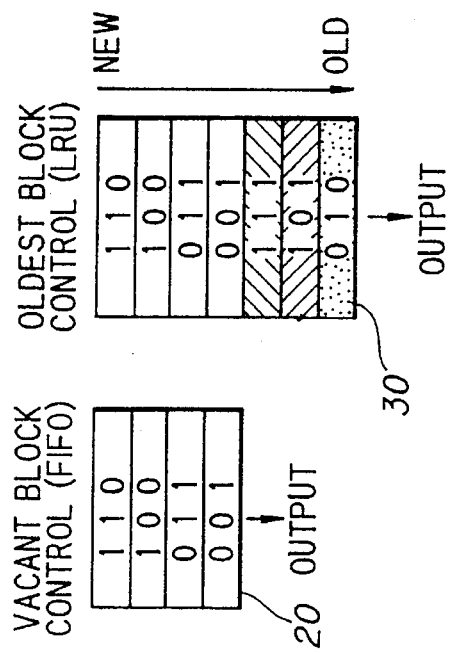

FIG. 5A (STATE 3)

| BLOCK ADDRESS | TIME | KIND | ALARM RANK |
|---|---|---|---|
| 0 0 1 | 16:00 | A | 1 |
| 0 1 0 | 18:00 | C | 0 |
| 0 1 1 | 16:30 | E | 0 |
| 1 0 0 | 17:00 | A | 1 |
| 1 0 1 | 13:30 | E | 0 |
| 1 1 0 | 17:10 | B | 0 |
| 1 1 1 | 15:00 | G | 0 |

10

VACANT BLOCK CONTROL (FIFO): 0 0 0 → OUTPUT
20

OLDEST BLOCK CONTROL (LRU):
① 0 1 0
② 1 1 0
③ 1 0 0
④ 0 1 1
⑤ 0 0 1
⑥ 1 1 1
⑦ 1 0 1
→ OUTPUT
30

NUMBER OF BLOCKS FOR NEXT RETRIEVAL = 5

FIG. 5B (STATE 4)

| BLOCK ADDRESS | TIME | KIND | ALARM RANK |
|---|---|---|---|
| 0 0 1 |  |  |  |
| 0 1 0 | 18:00 | C | 0 |
| 0 1 1 | 16:30 | E | 0 |
| 1 0 0 |  |  |  |
| 1 0 1 | 13:30 | E | 0 |
| 1 1 0 | 17:10 | B | 0 |
| 1 1 1 | 15:00 | G | 0 |

10

VACANT BLOCK CONTROL (FIFO):
1 0 0
0 0 1
→ OUTPUT
20

OLDEST BLOCK CONTROL (LRU):
① 1 0 0
② 0 0 1
③ 0 1 0
④ 1 1 0
⑤ 0 1 1
⑥ 1 1 1
⑦ 1 0 1
→ OUTPUT
30

NUMBER OF BLOCKS FOR NEXT RETRIEVAL = 2

FIG. 14

| BLOCK ADDRESS | TIME | KIND | ALARM RANK |
|---|---|---|---|
| 0 0 1 | 9:00 | A | 1 |
| 0 1 0 | 10:10 | B | 0 |
| 0 1 1 | 10:20 | A | 1 |
| 1 0 0 | 12:30 | C | 1 |
| 1 0 1 | 13:30 | E | 0 |
| 1 1 0 | 14:00 | A | 1 |
| 1 1 1 | 15:00 | G | 0 |

MEM

FIG. 15(a) PRIOR ART (STATE 1)

| BLOCK ADDRESS | TIME | KIND | ALARM RANK |
|---|---|---|---|
| 0 0 1 | 9:00 | A | 1 |
| 0 1 0 | 10:10 | B | 0 |
| 0 1 1 | 10:20 | A | 1 |
| 1 0 0 | 12:30 | C | 1 |
| 1 0 1 | 13:30 | E | 0 |
| 1 1 0 | 14:00 | A | 1 |
| 1 1 1 | 15:00 | G | 0 |

—MEM

↓ ① TRANSMIT DATA OF ALARM RANK 1

(STATE 2) ## FIG. 15(b) PRIOR ART

| BLOCK ADDRESS | TIME | KIND | ALARM RANK |
|---|---|---|---|
| 0 0 1 |  |  |  |
| 0 1 0 | 10:10 | B | 0 |
| 0 1 1 |  |  |  |
| 1 0 0 |  |  |  |
| 1 0 1 | 13:30 | E | 0 |
| 1 1 0 |  |  |  |
| 1 1 1 | 15:00 | G | 0 |

—MEM

↓ ② MOVE DATA UPWARD (STATE 3) ## FIG. 15(c) PRIOR ART

| BLOCK ADDRESS | TIME | KIND | ALARM RANK |
|---|---|---|---|
| 0 0 1 | 10:10 | B | 0 |
| 0 1 0 | 13:30 | E | 0 |
| 0 1 1 | 15:00 | G | 0 |
| 1 0 0 |  |  |  |
| 1 0 1 |  |  |  |
| 1 1 0 |  |  |  |
| 1 1 1 |  |  |  |

—MEM

↓ ③ ADD NEW DATA HEREINAFTER

FIG.16(a) PRIOR ART (STATE 4)

| BLOCK ADDRESS | TIME | KIND | ALARM RANK |
|---|---|---|---|
| 0 0 1 | 10:10 | B | 0 |
| 0 1 0 | 13:30 | E | 0 |
| 0 1 1 | 15:00 | G | 0 |
| 1 0 0 | 16:00 | A | 1 |
| 1 0 1 | 16:30 | E | 0 |
| 1 1 0 | 17:00 | A | 1 |
| 1 1 1 | 17:10 | B | 0 |

— MEM

④ MEMORY BECOMES FULL. THE OLDEST DATA AT THE FIRST ADDRESS IS REPLACED BY NEW DATA FOR UPDATING.

(STATE 5)

| BLOCK ADDRESS | TIME | KIND | ALARM RANK |
|---|---|---|---|
| 0 0 1 | 18:00 | C | 0 |
| 0 1 0 | 13:30 | E | 0 |
| 0 1 1 | 15:00 | G | 0 |
| 1 0 0 | 16:00 | A | 1 |
| 1 0 1 | 16:30 | E | 0 |
| 1 1 0 | 17:00 | A | 1 |
| 1 1 1 | 17:10 | B | 0 |

— MEM

FIG.16(b) PRIOR ART

MEMORY CONTROL METHOD AND APPARATUS THEREFOR

BACKGROUND OF THE INVENTION

1. Field of the Invention

The present invention relates to a memory control method and an apparatus, more particularly, a memory control method for serially storing pieces of record information on events in a memory of a predetermined size and, when the memory becomes full, storing the record information on a new event at the address at which the oldest record information is stored or at an apparently vacant address where the record information which has proved to be unnecessary as a result of reference is stored. The present invention also relates to an apparatus used for such a memory control method.

2. Description of the Related Art

In a cellular mobile phone system, a service area is minutely divided into a plurality of cells (radio zones) $1_1, 1_2, 1_3, \ldots$, and one radio base station $2_1, 2_2, 2_3, \ldots$ is provided in each cell, as shown in FIG. 13. On radio line-control station (not shown) is provided in each group of several radio base stations, and each radio line-control station is connected to a mobile telephone exchange 3 which is connected, in turn, to a telephone exchange 4 of a public telephone network. In such a cellular mobile phone system, the radio base station for receiving the electric wave is sequentially switched over to another radio base station with the movement of a portable telephone terminal 5 or a mobile telephone terminal 6 so as to enable communication with a fixed indoor telephone 7 or another mobile telephone. Thus, not only communication in a wide range but also an increase in the number of channels and an infinite increase in the number of lines are possible.

A monitor for monitoring an abnormality in a line, equipment, machine or the like is provided in each radio base station, and each monitor transmits abnormality information (alarm information) to the monitor of a predetermined master station (e.g., radio line-control station) by radio. The monitor of the master station collects alarm information from each radio base station, and stores the record of each alarm information into a memory of a predetermined size.

As shown in FIG. 14, record information includes (1) the time at which an alarm is produced, (2) the kind of the alarm, (3) the rank of the alarm, etc. The rank of the alarm is a value indicating the degree of importance of the alarm, i.e., whether or not the alarm influences the line. Although the rank is indicated only by two levels "1" and "0" in FIG. 14, the number of levels may be increased.

A memory MEM for storing record information has a capacity for storing a predetermined number N of pieces of record information so as to constantly store the latest N pieces of record information. In the memory MEM shown in FIG. 14, the maximum number of pieces of record information stored therein is set at seven (N=7) so as to simplify explanation, but a general memory actually can store a considerable number of pieces of record information.

In order to store (arrange) record information into the memory MEM, one block (composed of a plurality of addresses) of the memory MEM is allotted to one piece of record information, and plural pieces of record information are stored in the corresponding blocks. In other words, the plural pieces of record information are serially written in the order of production in the blocks whose addresses increase from the smallest address in turn, and when the memory becomes full, the oldest record information stored in the block having the smallest address is replaced by new record information. When another new piece of record information is produced, it is stored in the block having the next address in place of the old record information stored therein. In this way, the latest N pieces of record information are constantly stored in the memory MEM.

The monitor of each master station transmits the record information having a high alarm rank (rank=1) among the stored record information to a host centralized monitor at a regular interval of time (e.g., 1 minute). The centralized monitor collects the transmitted record information, and a maintenance man maintains the mobile radio system on the basis of the record information. The monitor of the master station transmits record information having a low rank when it is requested by the centralized monitor.

After the monitor of the master station transmits record information to the centralized monitor, it stores new record information in the vacant block in which the record information transmitted has been stored. In other words, when record information is transmitted to a host centralized monitor, the remaining pieces of record information are moved upward, and new pieces of record information are serially stored in the thus-produced vacant blocks.

FIGS. 15 and 16 are explanatory views of a conventional memory control method.

When plural pieces of record information are serially written in the order of production in the blocks whose addresses increase from the smallest address in turn and the memory MEM becomes full, the oldest record information stored in the block is replaced by new record information. In this way, the latest N pieces of record information are constantly stored in the memory MEM (State 1 in FIG. 15(a)).

In this state, when the record information of an alarm rank 1 is retrieved and transmitted to a host centralized monitor, the blocks of the block addresses "001", "011", "100" and "110" become vacant (State 2 in FIG. 15(b)). The monitor then serially move the record information upward in the memory MEM. As a result, the blocks of the block addresses "100" and thereafter become vacant (State 3 in FIG. 15(c)). Record information of a high alarm rank is retrieved by reference to the record information at all block addresses.

When a new alarm is produced, the record information on the alarm is stored in the block of the block address "100" (State 4 in FIG. 16(a)). Other new pieces of record information are serially stored in the blocks of the block addresses "101" and thereafter. In this way, when the memory becomes full and another new alarm is produced, the oldest record information stored in the block having the smallest address is replaced by new record information. When another new piece of record information is produced, it is stored in the block having the next address in place of the old record information stored therein. In this way, the latest N pieces of record information are constantly stored in the memory MEM (State 5 in FIG. 16(a)).

As the memory MEM for storing record information, a non-volatile memory such as an EEP-ROM is used with due consideration of power failure. Such a non-volatile memory, however, takes much time for writing in comparison with a RAM or the like. Therefore, in a conventional memory control method, it takes a considerable time to move data (record information) in the EEP-ROM, which is necessary in order to gather vacant blocks. The larger the maximum number N of pieces of record information which is stored in the memory is, the more time is necessary for moving data.

In addition, in a conventional memory control method, since record information having a high alarm rank is retrieved by reference to the record information at all block addresses, it takes much time.

Furthermore, when a CPU executes various processing in addition to the memory control in a multiple task, since data movement and data retrieval take much time, the other processing time is shortened, which results in a reduction in the throughput.

SUMMARY OF THE INVENTION

Accordingly, it is a first object of the present invention to eliminate the above-described problems in the related art and to provide a memory controlling apparatus which enables the latest N pieces of record information to be constantly stored in a memory without the need for data movement when a block becomes vacant.

It is a second object of the present invention to provide a memory controlling apparatus which enables the retrieval of the record information satisfying desired conditions, for example, the record information having a high alarm rank without referring to the record information at all block addresses.

To achieve the first object, the present invention provides a memory controlling apparatus comprising: a memory for storing the record information on an event; a control unit for storing record information on a new event at the address of the memory at which the oldest record information is stored when the memory becomes full and for storing record information on a new event at an apparently vacant address where the record information which has proved to be unnecessary as a result of reference is stored; a vacant address controller for serially storing the address data for specifying the vacant addresses where record information which is referred to has been stored in the order of reference, supplying the address data in the order of storage, and designating the addresses for storing the record information on new events by the supplied address data; and an LRU unit for storing address data which specifies the address of the memory at which record information is stored in the order of storage. In the memory controlling apparatus, when a new event occurs, the control unit obtains the address at which the oldest record information is stored from the LRU unit if no address is designated by the vacant address controller, and stores the record information on the new event at the address obtained and, at the same time, updates the contents of memory of the LRU unit. On the other hand, if the address is designated by the vacant address controller, the control unit stores the record information on the new event at the designated address and updates the contents of memory of the LRU unit.

To achieve the second object, the present invention provides a memory controlling apparatus comprising: a monitor for monitoring the number n of the pieces of record information as an object of retrieval by inputting the address data for specifying n addresses where record information referred to is stored to a vacant address controller and an LRU unit in the order of reference, holding the latest n as the number of pieces of record information as an object of next retrieval and, adding 1 to the number n of the pieces of record information as the objects of retrieval every time a new event occurs after new n events have occurred; and a retrieving unit for obtaining the addresses of the latest n pieces of record information in the memory from the LRU unit at the time of retrieval, and retrieving the record information which satisfies a predetermined condition from the latest n pieces of record information.

Other features and advantages of the present invention will be apparent from the following description taken in conjunction with the accompanying drawings.

BRIEF DESCRIPTION OF THE DRAWINGS

FIG. 1 schematically explains the principle of the present invention;

FIGS. 2A and 2B are first schematic explanatory views of a record information storage process in the present invention;

FIGS. 5A and 5B are second schematic explanatory views of a record information retrieval process in the present invention;

FIG. 14 is an explanatory view of record information which is stored in the memory;

FIGS. 15(a) to 15(c) are first explanatory views of a conventional memory control method; and FIGS. 16(a) and 16(b) are second explanatory views of a conventional memory control method.

Figure 3A:
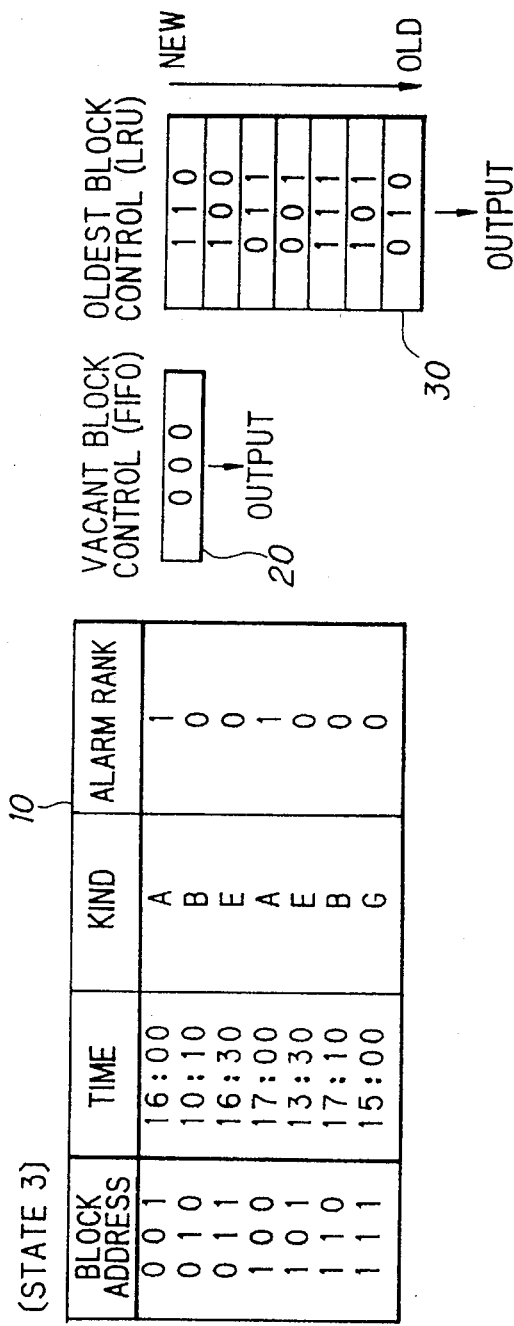
FIGS. 3A and 3B are second schematic explanatory views of a record information storage process in the present invention.

DESCRIPTION OF THE PREFERRED EMBODIMENT (a) Schema of present invention

FIG. 1 is a schematic explanatory view of the principle of the present invention.

The reference numeral 10 represents a record information memory of a predetermined size which serially stores record information on events, and when the memory 10 becomes full, it stores the record information on a new event at the address at which the oldest record information is stored, or at an apparently vacant address where the record information which has proved to be unnecessary (because, e.g., it has been transmitted to a host apparatus) as a result of reference is stored.

The reference numeral 20 represents a vacant address controller such as an FIFO (First in First Out) memory, which stores the address data for specifying the addresses where record information which is referred to has been stored in the order of reference, supplies those address data in the order of storage and designates the addresses for storing the record information on new events by the supplied address data.

The reference numeral 30 denotes a LRU (Least Recently Used) unit. The LRU unit 30 stores an address data which specifies an address of the memory 10 every time record information is stored therein, and if the same address data as that stored in the LRU unit 30 is input, the stored address data is eliminated and the input address data is stored as the latest address data.

The reference numeral 40 represents a control unit. When a new event occurs, if an address is not designated by the vacant address controller 20, the control unit 40 obtains the address at which the oldest record information is stored from the LRU unit 30, stores the record information on the new event at the block addresses of the record information memory 10 designated by the address, and updates the contents of memory of the LPU unit 30. If the address is designated by the vacant address controller 20, the control unit 40 stores the record information on the new event in the block of the memory 10 consisted of the designated address. In this manner, the N pieces of record information on the latest events are constantly stored in the record information memory 10 without the need for moving the record information upward every time a block becomes vacant.

When n pieces of record information are referred to, the control unit 40 inputs address data for specifying n number of addresses at which the referred record information is stored to the vacant address controller 20 and the LRU unit 30 in the order of reference, and holds n as the number of pieces of record information as the objects of next retrieval. Whenever a new event occurs, 1 is added to the number n (n+1→n). At the time of retrieval of predetermined record information, the addresses of the record information memory 10 where the n latest pieces of record information are stored are obtained by the LRU unit 30, and the record information which satisfies a predetermined condition is retrieved from the n pieces of record information stored at the addresses. In this manner, it is possible to retrieve desired record information without the need for reference to all the record information.

(b) Record information storage process

FIGS. 2 and 3 are explanatory views of a record information storage process in the present invention. Hereinafter, the word "address" may be used for signifying an area which stores the record information or an address data which specifies the area suitably.

The reference numeral 10 represents a record information memory of a predetermined size. One block in the memory 10 is allotted to one piece of record information and the memory 10 serially stores record information on events in the order of occurrence. When the memory 10 becomes full, it stores the record information on a new event at the address at which the oldest record information is stored. When record information is referred to (e.g., transmitted to a host apparatus) and, as a result, becomes unnecessary, the block which has stored the record information referred to is regarded as vacant and the record information on a new event is stored in that block. One block is composed of a plurality of addresses for storing the time at which an alarm is produced, the kind of alarm, the alarm rank, etc., and the first address of the block is called a block address.

The record information memory 10 has a capacity for storing a predetermined number N of pieces of record information and constantly stores the latest record information. In these drawings, the record information memory 10 is assumed to have a capacity for storing the latest seven pieces of record information for the sake of convenience of explanation.

The reference numeral 20 represents a vacant address controller such as an FIFO (First in First Out) memory having a memory structure, which stores the (vacant) block addresses where record information which is referred to has been stored in the order of reference, supplies those (vacant) block addresses in the order of storage and designates the supplied addresses as the addresses for storing the record information on new events.

The reference numeral 30 denotes an LRU (Least Recently Used) circuit. The LRU circuit 30 stores the address of a block of the record information memory 10 every time record information is stored at the block, and if the same address as that stored in the LRU circuit 30 is input, the latter is eliminated and the input address is stored as the latest address.

Record information is first written in the block of the smallest address of the record information memory 10, and the record information on a new event is written in the block of the second smallest address. In this way, record information on events are written in the order of occurrence until the record information memory 10 becomes full (State 1 in FIG. 2A). No change is caused in the vacant block controller 20, but block addresses are stored in the LRU circuit 30 in the order of writing. The oldest address is "001".

If the record information of the alarm rank "1" is retrieved and transmitted to a host centralized monitor in this state, the block addresses "001", "011", "100" and "110" become vacant (State 2 in FIG. 2B). The (vacant) block addresses "001", "011","100" and "110" at which the transmitted record information is stored are written into the vacant block controller 20 in the order of transmission. The vacant block addresses "001", "011", "100" and "110" are also input to the LRU circuit 30, as shown in FIG. 2B.

If a new alarm is produced in this state, the block address "001", which has first been written, is first output from the vacant block controller 20. The record information (16.00, A, 1) on the new alarm is therefore written in the block of the record information memory 10 designated by the address "001". Thereafter, every time a new alarm is produced, the block address is output in the order of "011", "100" and "110", so that the record information "16.30, E, 0", "17.00, A, 1" and "17.10, B, 0" is stored at the corresponding block address ((State 3 in FIG. 3A).

Figure 3B:
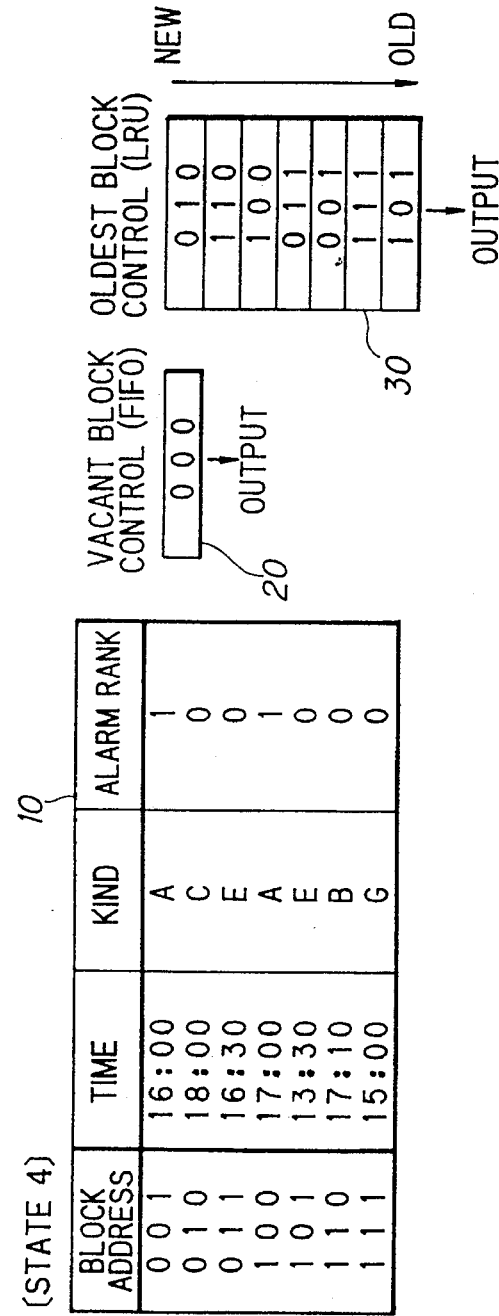

Since the vacant block controller 20 has an FIFO structure, the number of block addresses which are to be output is decreased every time the block address is output in the order of storage, and when the four addresses are output, the number becomes 0 (indicated by "000" in the vacant controller 20 in FIG. 3A). The block addresses "001", "011", "100" and "110" at which the record information is stored are also input to the LRU circuit 30. The contents of the LRU circuit 30 (shown in FIG. 3A) become the same as the contents of the LRU circuit 30 shown in FIG. 2B at the point at which these four block addresses are input to the LRU circuit 30.

In this manner, the number of block addresses stored in the vacant block controller 20 becomes 0 and the record information memory 10 becomes full. In this state, even if a new alarm is produced, no block address is designated by the vacant address controller 20. When no block address is designated by the vacant address controller 20, the block address "010" at which the oldest record information is stored is obtained from the LRU circuit 30, and the record information "18.00, C, 0" on a new alarm is stored at the block of the record information memory 10 which is designated by the address "010". At the same time, the address "010" is input to the LRU circuit 30 so as to update the contents of memory (State 4 in FIG. 3B). This operation is repeated thereafter.

According to this method, it is possible to control vacant blocks and the oldest block, and to write record information at a random position owing to the FIFO function and the LRU function. That is, when a block becomes vacant due to the transmission (reference) of record information to a host apparatus, new record information is stored in the vacant block in accordance with the instruction from the vacant block controller 20. When there is no vacant block, new record information is stored in the block at which the oldest record information is stored. As a result, even if a block becomes in the record information memory 10 vacant, it is not necessary to move the date upward unlike in the related art.

(c) Record information retrieval process

Figure 4A:
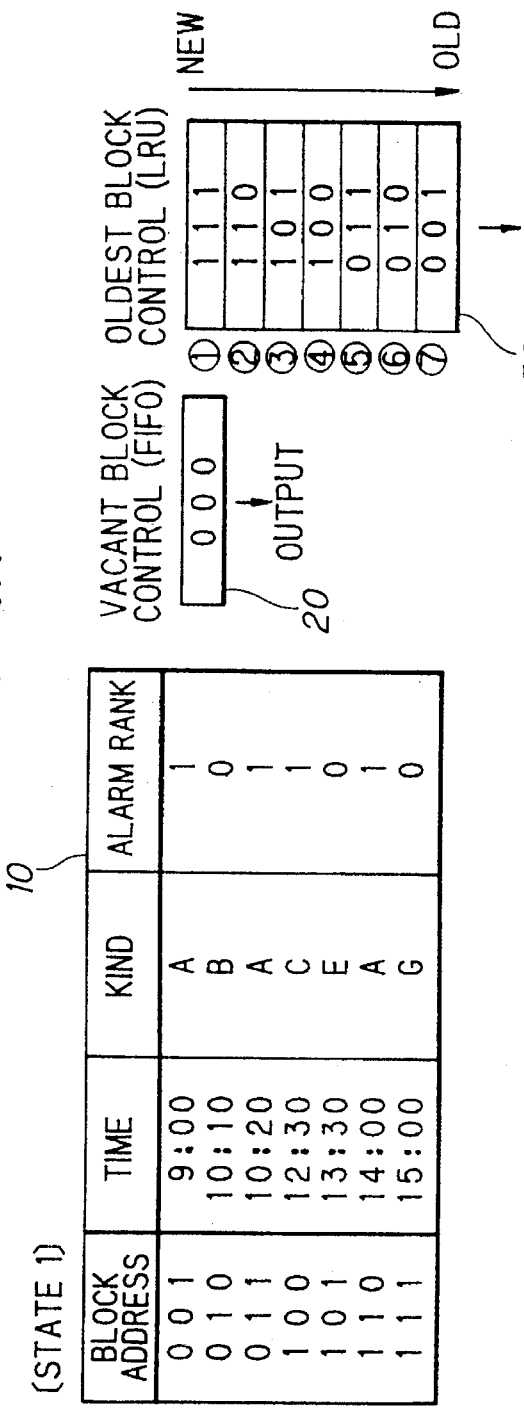
FIGS. 4A and 4B are first schematic explanatory views of a record information retrieval process in the present invention.

FIGS. 4 and 5 are schematic explanatory views of a record information retrieval process in the present invention.

Record information is first written in the block of the smallest address of the record information memory 10, and the record address on a new event is written in the block of the second smallest address. In this way, record information on events are written in the order of occurrence until the record information memory 10 becomes full (State 1 in FIG. 4A).

In this state, the record information of the alarm rank "1" is retrieved and transmitted to a host centralized monitor. The object of retrieval for the record information of the alarm rank "1" is all the record information. Therefore, the contents of memory are read out of the addresses of all blocks at which the alarm ranks are stored so as to retrieve the record information of the alarm rank "1". As a result, it is found that the record information stored at the block addresses "001", "011", "100" and "110" have the alarm rank "1", and the record information at these block addresses is read out and transmitted to the host centralized monitor.

Figure 4B:
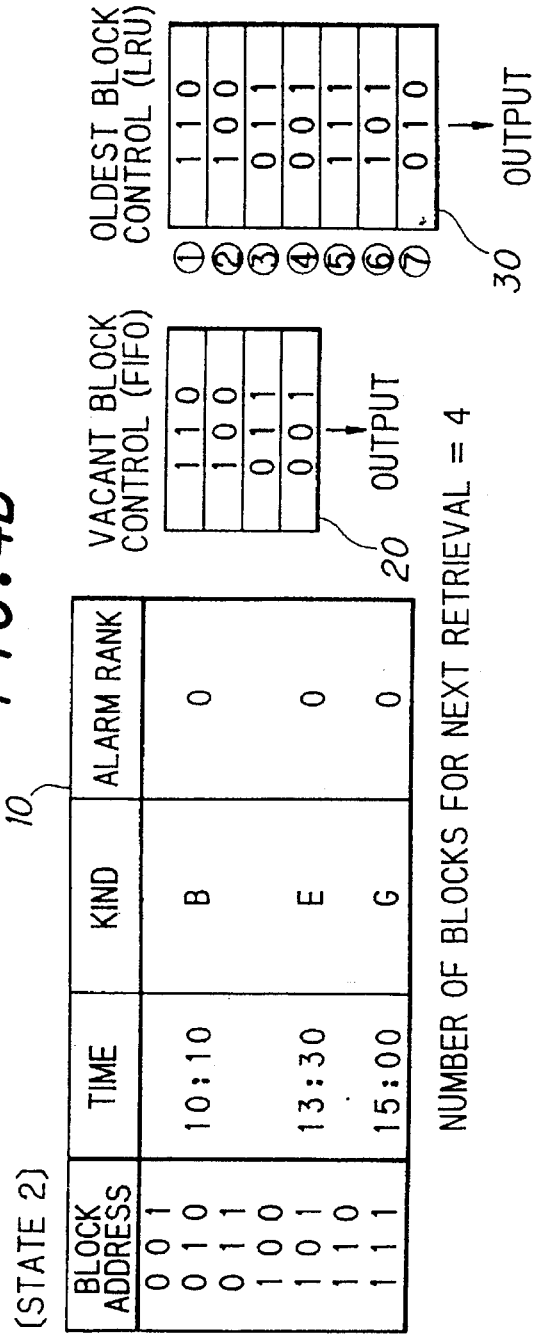

In this way, the block addresses "001", "011", "100" and "110" become vacant (State 2 in FIG. 4B). The (vacant) block addresses "001", "011", "100" and "110" at which the transmitted record information is stored are written into the vacant block controller 20 in the order of transmission. The vacant block addresses "001", "011", "100" and "110" are also input to the LRU circuit 30, as shown in FIG. 4B. In this case, the number n of pieces of record information as an object of retrieval is judged to be 4 from the number of block addresses (the difference between an input address pointer and an output address pointer) stored in the vacant block controller 20. This is because the remaining three pieces of record information which are not transmitted have such a low alarm rank that it is not necessary to consider them as the object of retrieval any more and new record information which is to be stored at the vacant block addresses "001", "011", "100" and "110" become the object of retrieval thereafter.

If a new alarm is produced in this state, the block address "001", which has first been written, is first output from the vacant block controller 20. The record information (16.00, A, 1) of the new alarm is therefore written in the block of the record information memory 10 designated by the address "001". Thereafter, every time a new alarm is produced, the block address is output in the order of "011", "100" and "110", so that the record information "16.30, E, 0", "17.00, A, 1" and "17.10, B, 0" is stored at the corresponding block address. The number n is not updated until the n=4 pieces of new record information as an object of retrieval are stored.

When the n=4 pieces of new record information as an object of retrieval are stored in the record information memory 10 in this manner, the number of block addresses stored in the vacant block controller 20 becomes 0, and the record information memory 10 becomes full. In this state, even if a new alarm is produced, no block address is designated by the vacant address controller 20. In such a case, the block address "010" at which the oldest record information is stored is obtained from the LRU circuit 30, and the record information "18.00, C, 0" on a new alarm is stored at the block of the record information memory 10 which is designated by the address "010". At the same time, the address "010" is input to the LRU circuit 30 so as to update the contents of memory. In addition, 1 is added to the number n of pieces of record information as an object of retrieval, so that n becomes 5 (State 3 in FIG. 5A). This operation is repeated thereafter.

When the retrieval of the record information having the alarm rank "1" is necessary in the state 3, the record information having the alarm rank "1" is retrieved from the latest n (=5) pieces of record information. Since the latest 5 pieces of record information are stored at the block addresses ① to ⑤ in the LRU circuit 30, the record information having the alarm rank "1" is retrieved from the record information stored at the block addresses ① to ⑤. As a result, since the alarm rank of the record information stored at the block addresses "001" and "100" is "1", the record information at these block addresses is read out and transmitted to the host centralized monitor.

In this way, the block addresses "001" and "100" become vacant (State 4 in FIG. 5B). The (vacant) block addresses "001" and "100" at which the transmitted record information is stored are written into the vacant block controller 20 in the order of transmission. The (vacant) block addresses "001" and "100" are also input to the LRU circuit 30, as shown in FIG. 5B. The number n of pieces of record information as an object of retrieval is judged to be 2 from the difference between the input address pointer and the output address pointer stored in the vacant block controller 20 having the FIFO structure. This is because the remaining five pieces of record information which are not transmitted have such a low alarm rank that it is not necessary to consider them as the object of retrieval any more and new record information which is to be stored at the vacant block addresses "001" and "110" become the object of retrieval thereafter.

(d) Structure of alarm monitor

Figure 6:
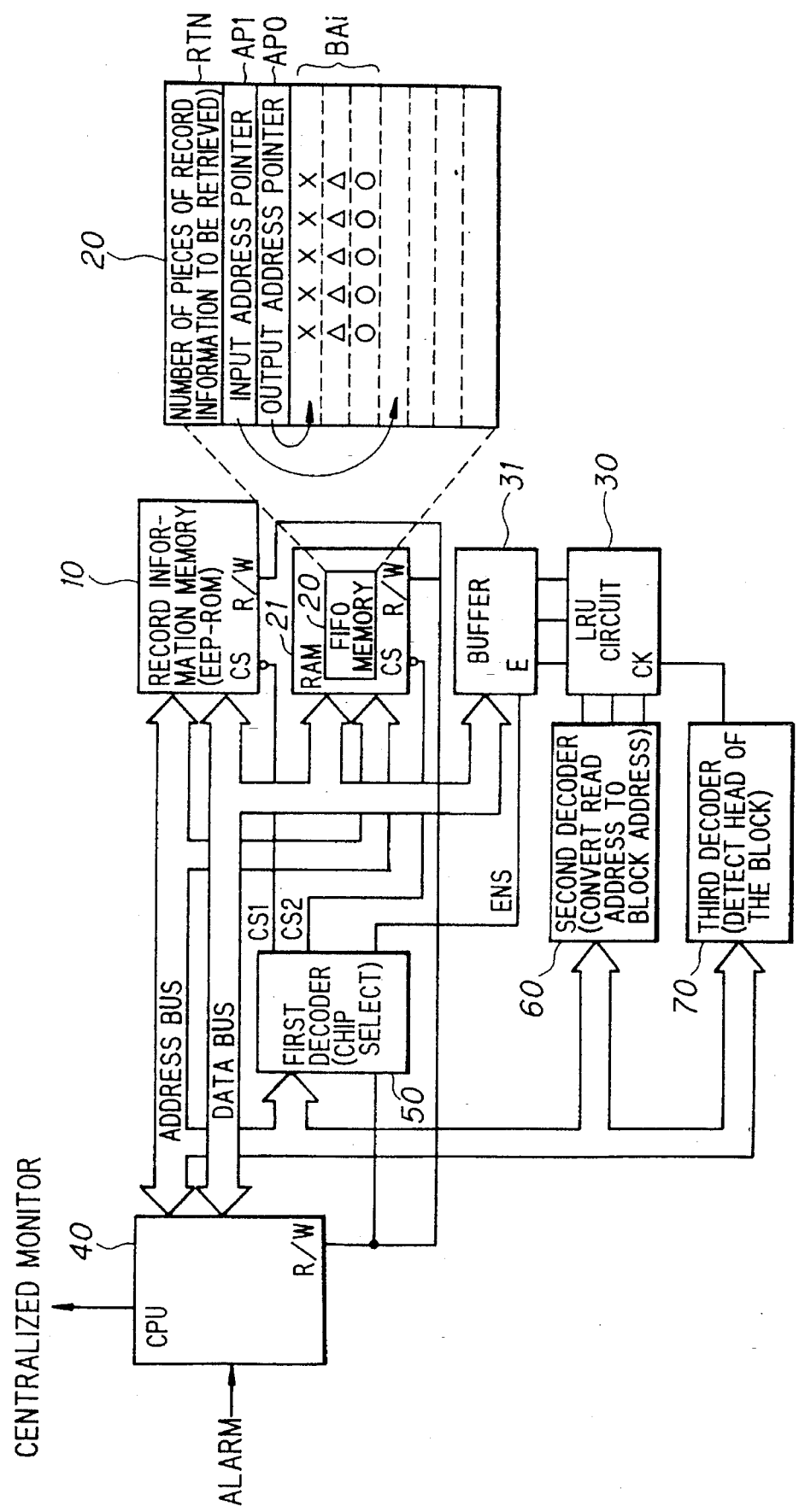
FIG. 6 shows the structure of an alarm monitor in the present invention.

FIG. 6 shows the structure of an alarm monitor in the present invention. The reference numeral 10 represents a record information memory composed of a non-volatile memory such as an EEP-ROM. One block in the memory 10 is allotted to one piece of record information and the memory 10 stores the latest N pieces of record information. One block is composed of a plurality of addresses for storing the time at which an alarm is produced, the kind of the alarm, the alarm rank, etc.

The reference numeral 21 represents a RAM having a FIFO memory (vacant block controller) 20. From the FIFO memory 20 data are read in the order of storage, so that the first written data is read out first. The FIFO memory 20 stores (1) block addresses $BA_1$, $BA_2$, ... at which the record information which is transmitted to a centralized monitor has been stored, (2) an input address pointer API for indicating the position at which a next block address is written, (3) an output address pointer APO for indicating the position from which a next block address is read out, and (4) the number RTN of pieces of record information which are to be retrieved.

The reference numeral 30 denotes an LRU (Least Recently Used) circuit. The LRU circuit 30 stores the address of the block every time record information is stored at a predetermined block of the record information memory 10, and if the same address as that stored in the LRU circuit 30 is input, the latter is eliminated and the input address is stored as the latest address. A buffer 31 stores the oldest address that is stored in the LRU circuit 30, and a control unit (CPU) 40 controls a record information storage process, a retrieval process and other processing.

The reference numeral 50 represents a first decoder in which the address data (real address) output from the CPU 40 is input and which outputs chip select signals CS1, CS2 to the record information memory 10 and the RAM 21 respectively and outputs an enable signal ENS to the buffer 31 on the basis of the real address, the reference numeral 60 denotes a second decoder for converting the real address to the block address of the record information memory 10, and 70 a third decoder for detecting whether or not the real address is the address (block address) at the head of the block.

Figure 7:
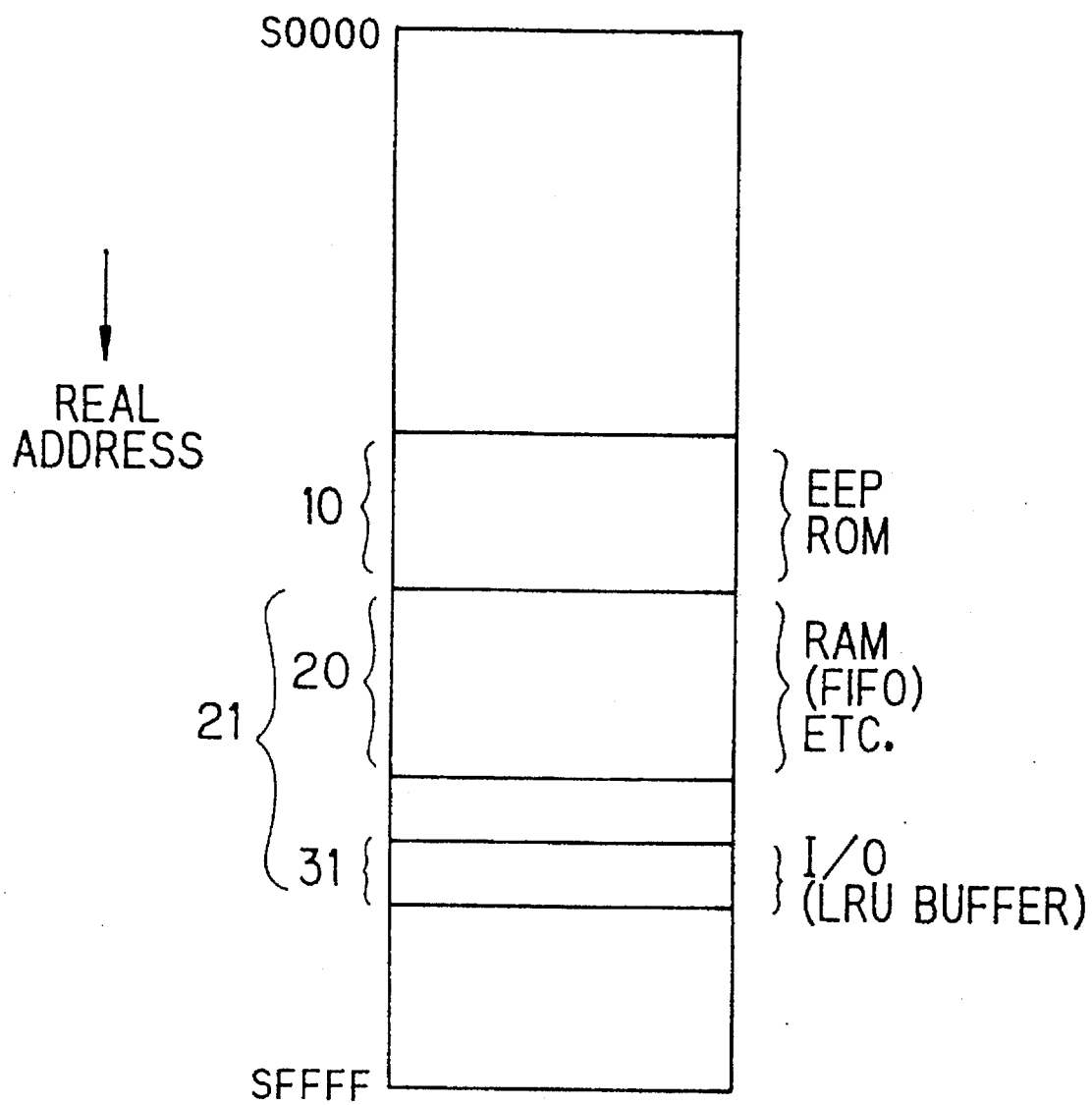
FIG. 7 is an explanatory view of a memory map.

FIG. 7 is an explanatory view of a memory map. Real addresses are attached to the record information memory (EEP-ROM) 10, the RAM 21, the buffer 31 and other memories, and the CPU 40 accesses these memories by using the real addresses.

(e) LRU circuit

Figure 8:
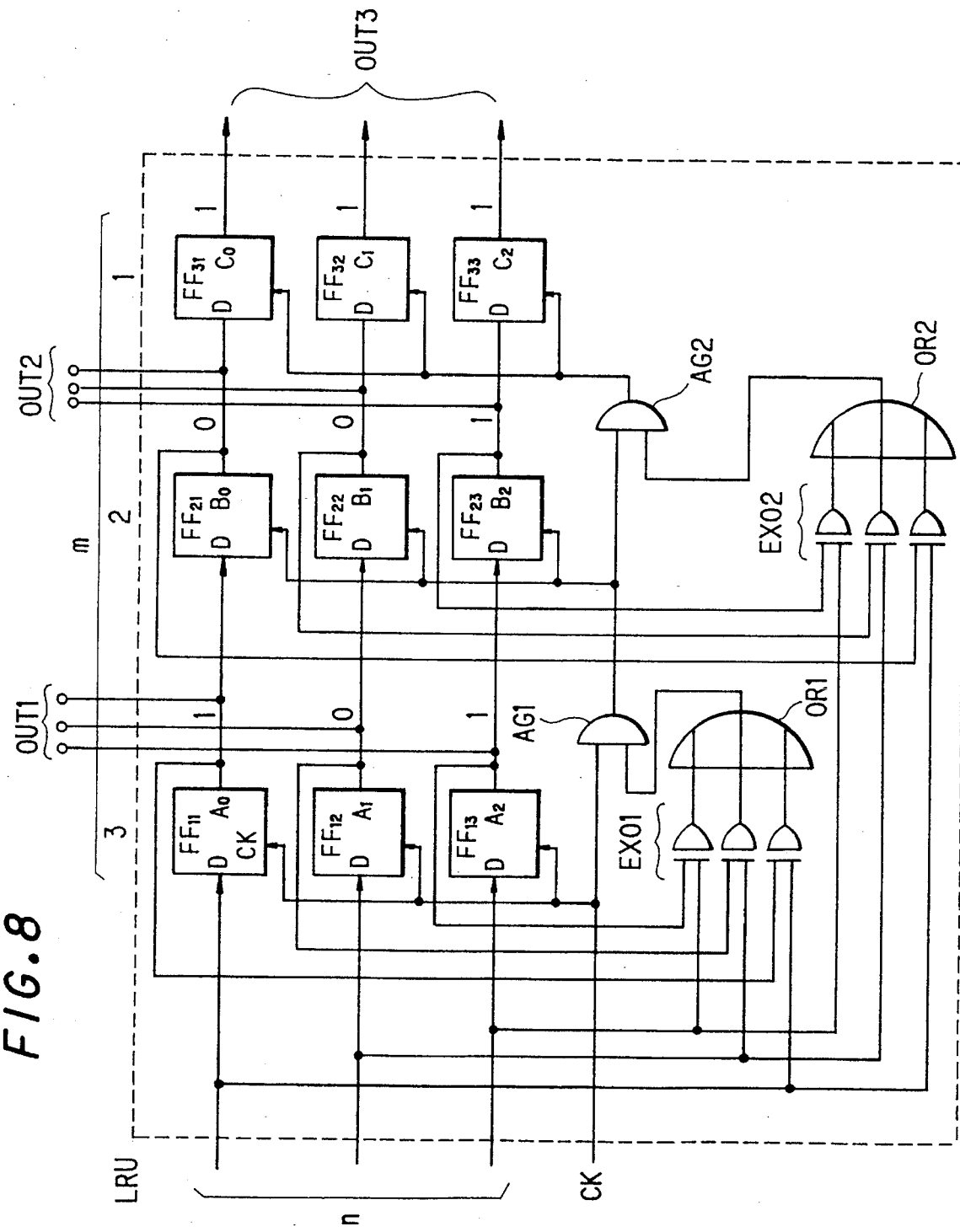
FIG. 8 is an explanatory view of the structure of an LRU circuit.

FIG. 8 is an explanatory view of the LRU circuit 30. When several overlapping data are input to the LRU circuit 30, it selects data which is not recently referred to and outputs the selected data. The LRU circuit 30 stores the data in the order of input, and when the same data as the data already stored is input, the LRU circuit 30 deletes the latter data and stores the input data as the latest data. The LRU circuit 30 shown in FIG. 8 has the structure for storing the three latest 3-bit data in the order of input, and has 3×3=9 D-type flip.flops $F_{11}$ to $F_{33}$. The right three D-type flip.flops $F_{31}$ to $F_{33}$ store the oldest 3-bit data, the middle three D-type flip.flops $F_{21}$ to $F_{23}$ store the second oldest 3-bit data, and the left three D-type flip.flops $F_{11}$ to $F_{13}$ store the latest 3-bit data.

An exclusive-OR EXO1 judges whether or not the latest 3-bit data (at the first stage) agrees with the input data. An OR gate OR1 outputs a signal of a high level when the 3-bit data at the first stage do not agree with the input data, and outputs a signal of a low level when the 3-bit data at the first stage agrees with the input data. An AND gate AG1 passes a clock signal CK when the output of the OR gate OR1 is a signal of a high level (when the 3-bit data at the first stage do not agree with the input data). Since the output of the AND gate AG1 becomes a clock signal of the middle D-type flip.flops $F_{21}$ to $F_{23}$ (at the second stage), when the 3-bit data at the first stage do not agree with the input data, the data at the first stage is shifted to the second stage as the second oldest data, and the input data is stored at the first stage as the latest data.

An exclusive-OR EXO2 judges whether or not the 3-bit data at the second stage agrees with the input data. An OR gate OR2 outputs a signal of a high level when the 3-bit data at the second stage do not agree with the input data, and outputs a signal of a low level when the 3-bit data at the second stage agrees with the input data. An AND gate AG2 passes a clock signal CK when the outputs of the OR gates OR1 and OR2 are signals of a high level (when the 3-bit data at the first and the second stage do not agree with the input data). Since the output of the AND gate AG2 becomes a clock signal of the right D-type flip.flops $F_{31}$ to $F_{33}$ (at the third stage), when the 3-bit data stored at the first and second stages do not agree with the input data, the data at the second stage is shifted to the third stage as the oldest data.

Figure 9A:
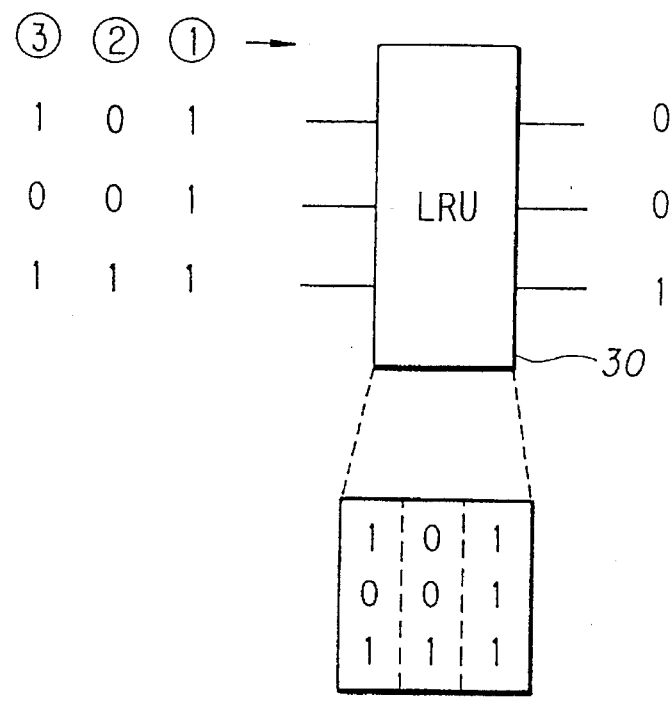
FIGS. 9(a) to 9(c) are explanatory views of the operation of the LRU circuit shown in FIG. 8.
Figure 9B:
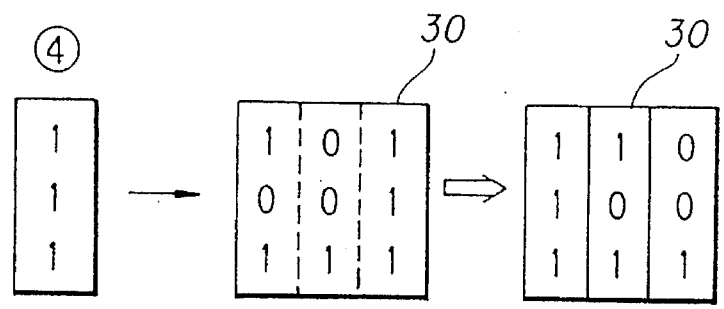
Figure 9C:
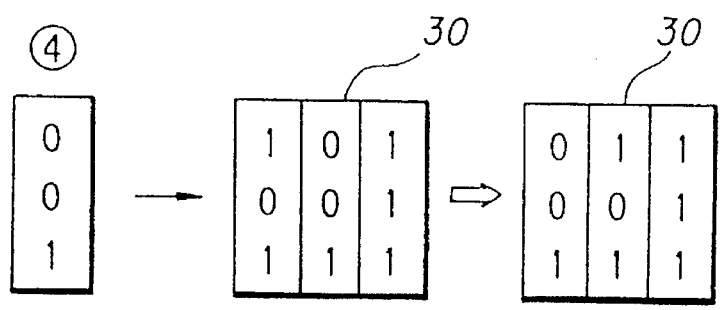

FIG. 9 is an explanatory view of the operation of the LRU circuit 30. When data "111", "001" and "101" are input as shown in FIG. 9(a), the data are serially stored in the D-type flip.flops of the LRU circuit 30. In this state, if data "111" is input, the contents of memory is changed as shown on the right in FIG. 9(b). Alternatively, if data "001" is input, the contents of memory is changed as shown on the right in FIG. 9(c).

As described above, the LRU circuit 30 stores data in the order of input, and if the same data as that stored in the LRU circuit 30 is input, the latter is eliminated and the input data is stored as the latest data. Therefore, when the block addresses of the record information memory 10 at which record information is stored are input as the data, the LRU circuit 30 stores the block addresses in the order of input, and if the same block address as that stored in the LRU circuit 30 is input, the latter is eliminated and the input block address is stored as the latest block address.

In the above example, 3-bit data are stored. In general, in the case of storing the latest m items of n-bit data, m×n D-type flip flops $F_{11}$ to $F_{mn}$ are provided in the LRU circuit, so that the n D-type flip.flops on the rightmost side store the oldest n-bit data while the n D-type flip.flops on the leftmost side store the latest n-bit data. In the embodiment shown in FIGS. 2 to 5, since it is necessary to store seven 3-bit block addresses, 3×7 D-type flip.flops are provided, and an exclusive OR gate, an OR gate and an AND gate are provided at each stage.

Since information on each stage of the LRU circuit is necessary in record information retrieve control, information is collected from each stage (OUT1 to OUT3) of the LRU circuit shown in FIG. 8. When record information retrieve control is taken into consideration, the LRU circuit shown in FIG. 6 preferably has the structure shown in FIG. 10.

Figure 10:
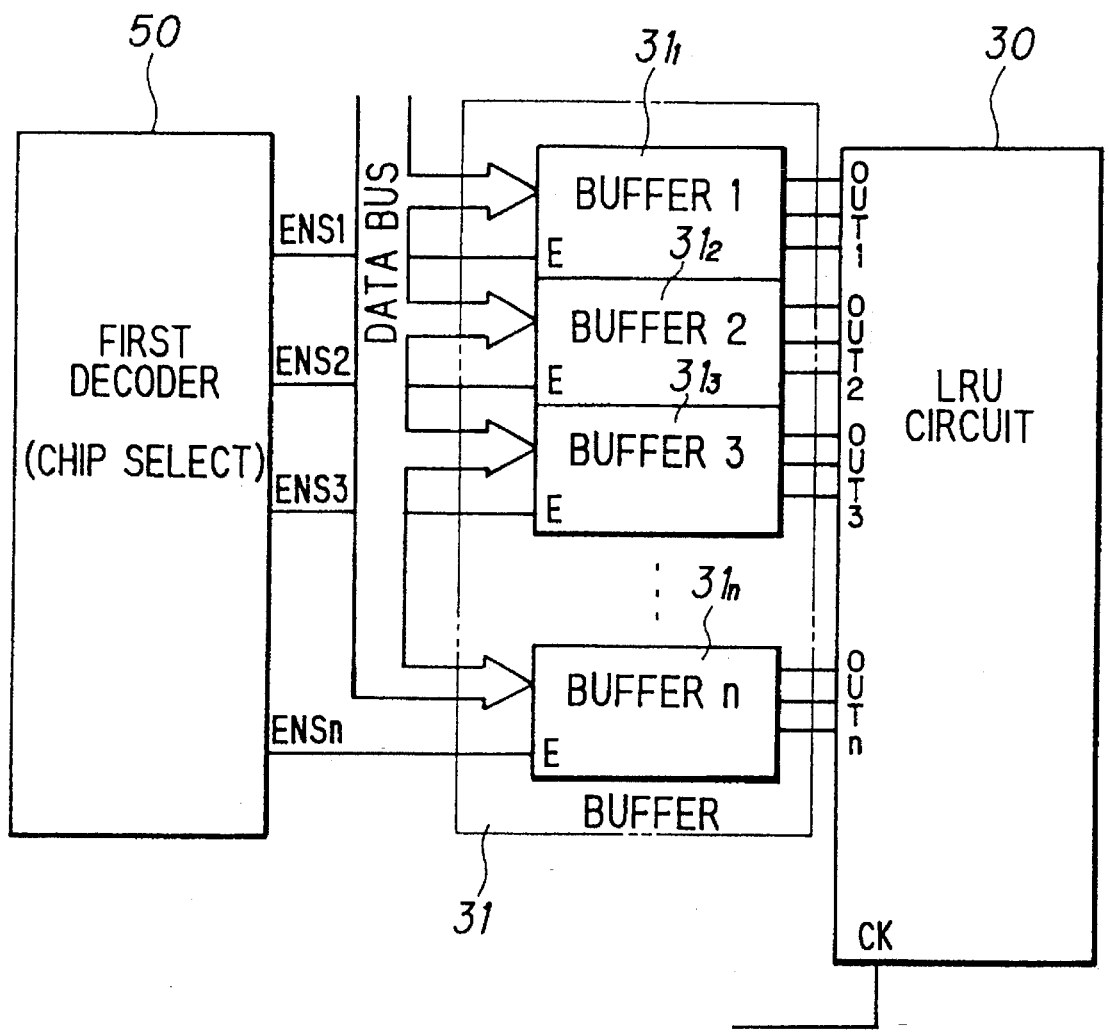
FIG. 10 shows the peripheral structure of the LRU circuit for realizing the information retrieval process in the present invention.

The structure shown in FIG. 10 is different from that in FIG. 6 in the following points:

Buffers $31_1$ to $31_n$ are provided in correspondence with the respective stages OUT1 to OUTn of the LRU circuit;

Enable signals $ENS_1$ to $ENS_n$ are input from the first decoder 50 to the buffers $31_1$ to $31_n$, and the data stored in each buffer (at each stage of the LRU circuit 30) is read by the control unit (CPU) 40 through the data bus.

(f) Record information storage processing by the control unit

Figure 11:
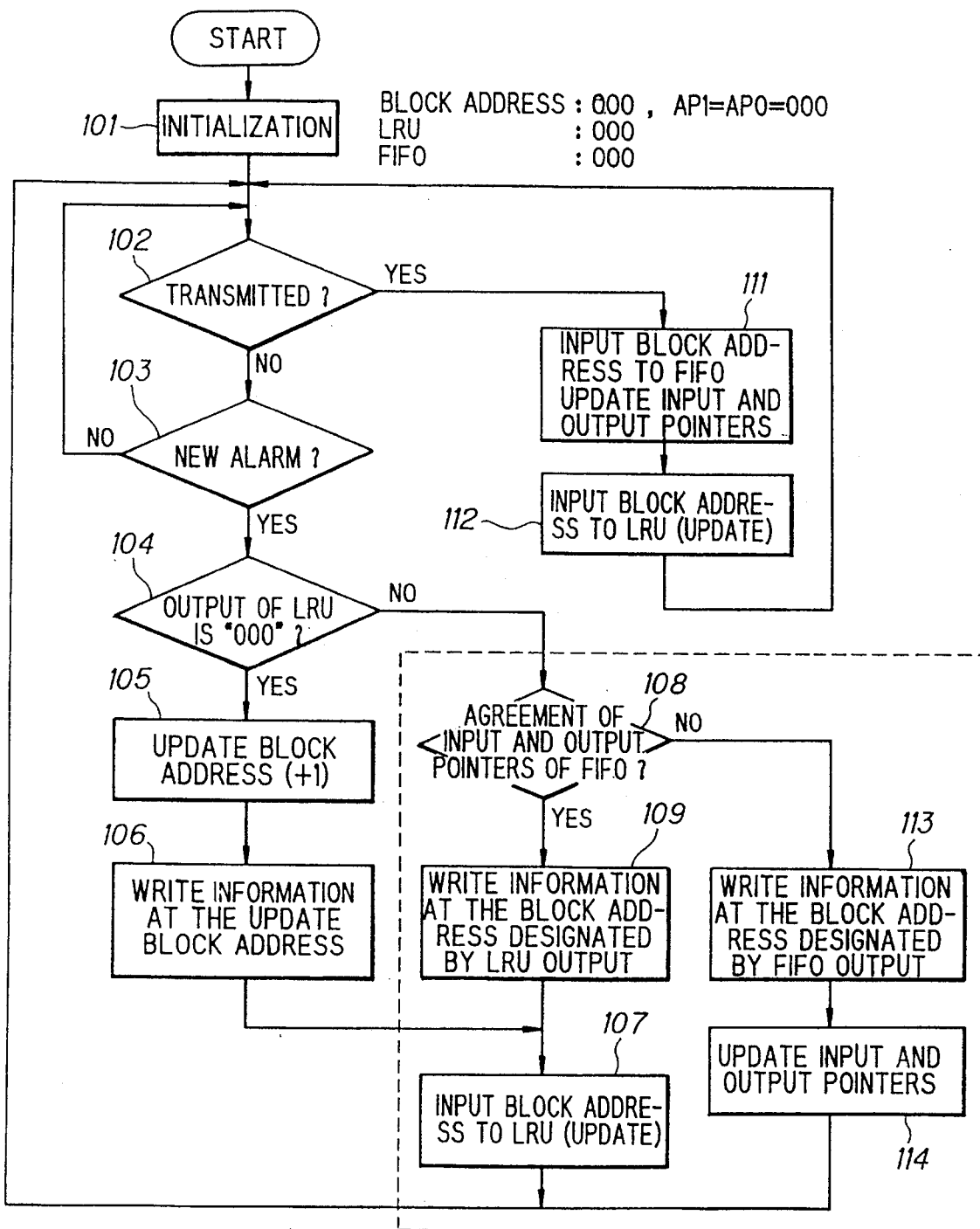
FIG. 11 is a flowchart of the record information storage processing by the CPU in the present invention.

FIG. 11 is a flowchart of a record information storage process.

At the time of initialization, the control unit (CPU) 40 clears all the contents of the record information memory 10, the FIFO memory 20 and the LRU circuit 30 to "0", and sets the block address BA and the input and output address pointers API, APO to the initial value "000" (step 101).

Judgement is then made as to whether or not record information of a high alarm rank is transmitted to the host centralized monitor (step 102). If the answer is NO, whether or not an alarm is produced is judged (step 103). If the answer is NO at the step 103, the process returns to the step 102.

If an alarm is produced, the real address of the buffer $31_n$ is produced. The first decoder 50 produces a buffer enable signal ENS so as to store the oldest block address (output OUTn of the LRU circuit) that is stored in the LRU circuit 30 into the buffer $31_n$. The CPU 40 then reads the contents of the buffer $31_n$ so as to judge whether or not the contents are "000" (step 104).

Since the fact that the contents of the buffer $31_n$ are "000" means that the record information memory 10 is not used to the last block, 1 is added to the block address BA (BA+1→

BA) (step 105). The CPU 40 then obtains the real address in correspondence with the updated block address, supplies the real address to the address bus, and the record information (time at which the alarm is produced) to the data bus, and changes the level of the R/W signal to a low level. When the real address of the record information memory 10 is supplied to the address bus, the first decoder 50 changes the level of the chip select signal CP1 of the record information memory (EEP-ROM) 10 to a low level. As a result, the record information (time at which the alarm is produced) is stored at the designated address.

In parallel with this operation, the real address is input to the second and third decoders 60, 70. The second decoder 60 changes the real address to a block address and inputs it to the LRU circuit 30. The third decoder 70 identifies the real address as the block address (the head address of the block) and outputs a clock signal CK. As a result, the LRU circuit 30 stores the input block address as the latest block address and shifts the block address which has already been stored.

Similarly, the kind of the alarm, the alarm rank are stored in the block of the record information memory 10. When the kind of the alarm, the alarm rank are stored, a real address is also input into the second and third decoders 60, 70, but since the real address is not the block address, no clock signal CK is output, so that the contents of the LRU circuit 30 do not change (steps 106, 107).

If the contents of the buffer 31$_n$ are not "000" at the step 104, in other words, if the LRU circuit 30 is filled with block addresses, the CPU 40 reads the contents of the input and output address pointers API, APO of the FIFO memory 20 so as to judge whether or not they agree with each other (step 108). The first decoder 50 changes the level of the chip select signal CS2 to a low level so as to make it accessible when a real address of the RAM 21 is produced on the address bus. Therefore, if the CPU 40 changes the level of the R/W signal to a low level when supplying the real address of the RAM 21 to the address bus, the CPU 40 can read and write data from and into the RAM 21 via the data bus.

If the contents of the input and output address pointers API, APO agree with each other, it means that no vacant block produced by the transmission of record information exists in the record information memory 10, so that new record information is written into the block designated by the block address stored in the buffer 31$_n$ in the same way as at the step 106 (step 109). In addition, the contents of the LRU circuit 30 are updated so as to serially hold the block addresses at which record information is stored in the order of input (step 107).

When the CPU 40 transmits record information of a high alarm rank to the centralized monitor at the step 102, the CPU 40 stores the block address at which the record information is stored at the storage area of the FIFO memory 20 designated by the input address pointer API, and adds 1 to the value of the input address pointer API (API+1→API). When the record information of a high alarm rank is read out of the record information memory 10 and transmitted, the block address produced on the address bus is input to the LRU circuit 30, thereby updating the contents of the LRU circuit 30 (steps 111, 112).

The process then returns to the step 102, and a similar processing is executed, so that the block addresses at which all the transmitted record information is stored are stored in the FIFO memory 20 and input to the LRU circuit 30, thereby updating the contents of the LRU circuit 30.

If an alarm is produced in this state, the answer becomes NO at the steps 104 and 108. Therefore, the CPU 40 reads the block address from the FIFO memory 20 designated by the output address pointer APO, and stores the record information on the new alarm in the block of the record information memory 10 designated by the block address (step 113). The contents of the LRU circuit 30 are updated by the block address.

Thereafter, 1 is added to the output address pointer APO (APO+1→APO) (step 114), and the process returns to the step 102 so as to repeat the processing at the steps 102 and thereafter. The record information on new alarms is serially stored in the blocks of the record information memory 10 designated by the block addresses read out of the FIFO memory 20 in accordance with the designation of the output address pointer APO until API equals APO at the step 108. When API=APO, the input and output address pointers API, APO are reset to the initial value. Record information is thereafter stored at the oldest block address that is output from the LRU circuit 30.

(g) Information retrieval processing by the CPU

Figure 12:
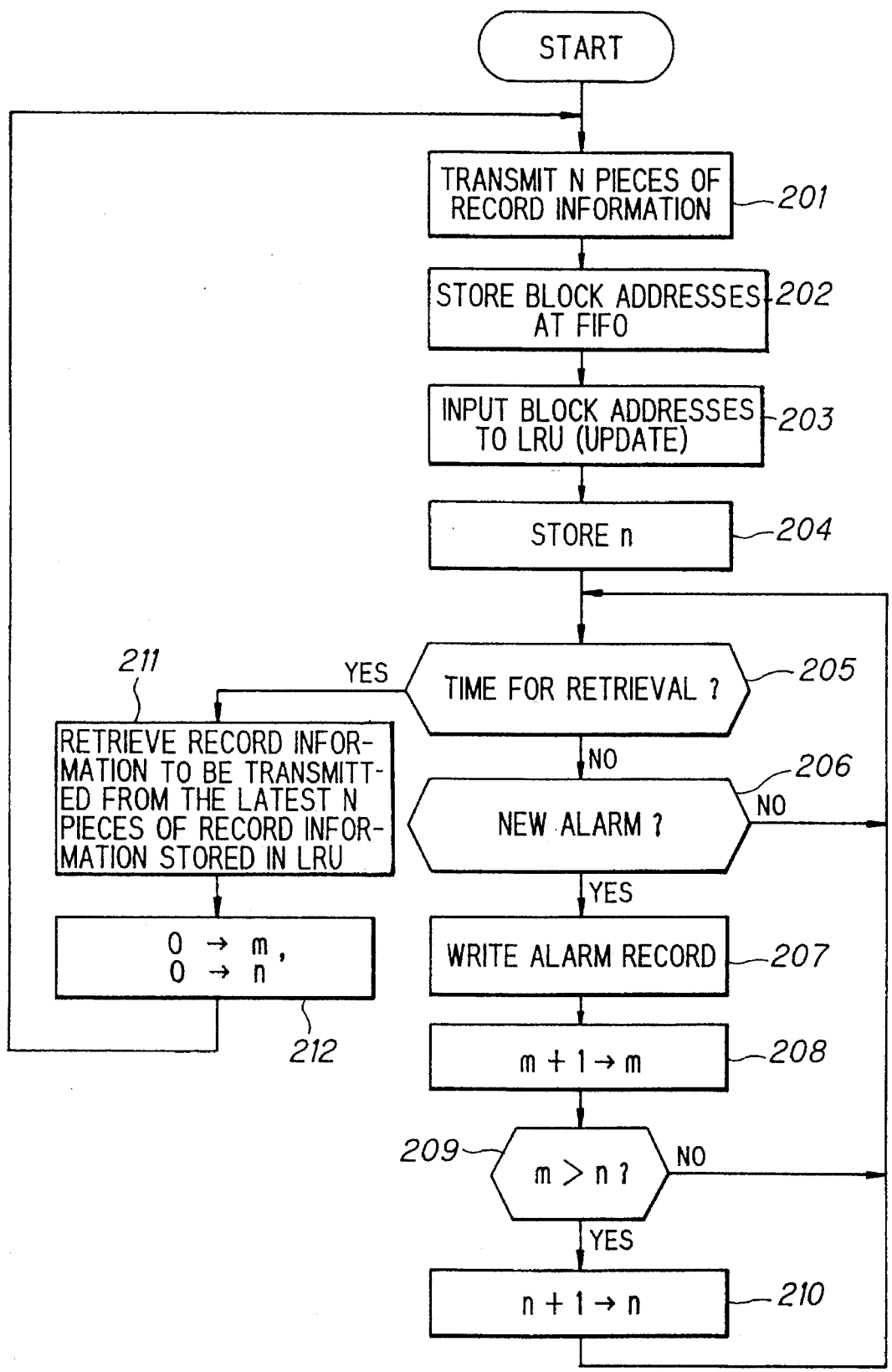
FIG. 12 is a flowchart of the information retrieval processing by the CPU in the present invention.
Figure 13:
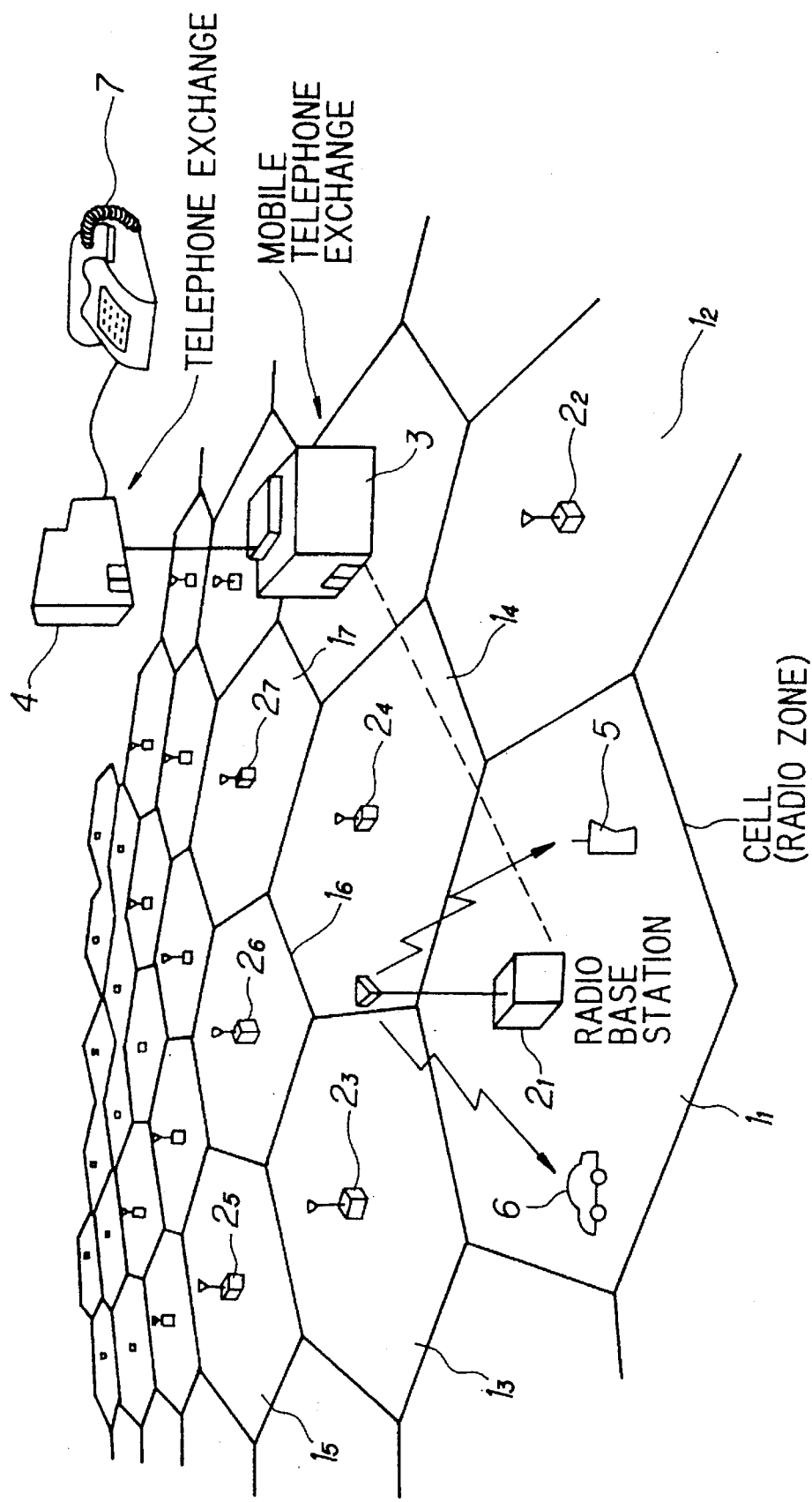
FIG. 13 is an explanatory view of a cellular mobile phone system.

FIG. 12 is a flowchart of an information retrieval process. The CPU 40 periodically (e.g., every 1 minute) retrieves the record information of a high alarm rank from the record information stored in the record information memory 10 and transmits the retrieved record information to the host centralized monitor.

At the time of initialization, the number n of pieces of record information as an object of retrieval is set to N (n=N). N represents the maximum number of pieces of record information that can be stored in the record information memory 10. In this state, when the time for retrieval comes, the control unit (CPU) 40 transmits N' pieces of record information of an alarm rank "1" among the n pieces of record information stored in the record information memory 10 to the centralized monitor (step 201).

The CPU 40 then stores N' number 06 the block addresses at which the transmitted record information have been stored into the FIFO memory 20 and increases the input address pointer API by N' (step 202). N' number of the block addresses are also input to the LRU circuit 30 so as to update the contents thereof (step 203), and the difference (N') between the input address pointer API and the output address pointer APO is stored in the FIFO memory 20 as the number n of pieces of record information as an object of retrieval (step 204). The number n (=N') is set as the number of pieces of record information as an object of next retrieval because the other pieces of record information which are not transmitted has such a low alarm rank that it is not necessary to consider them as the object of retrieval any more and newly stored record information becomes the object of retrieval thereafter.

Thereafter, judgement is made as to whether or not the time for retrieval has come (step 205). If the answer is NO, whether or not an alarm has been produced is judged (step 206). If the answer is YES, the alarm record writing process shown in the portion enclosed by the dotted lines in FIG. 11 is executed (step 207).

After the record information on the new alarm is written into the record information memory 10, 1 is added to m (initial value is 0) (step 208), and whether m>n is then judged. If m≦n, the process returns to the step 205, and the processing at the steps 205 and thereafter is repeated. On the other hand, if m>n, it means that new record information more than the initially set number n (=N') of pieces of record information as the object of retrieval is stored in the record information memory 10, so that 1 is added to n (n+1→n) (step 210), and the process returns to the step 205.

On the other hand, if the answer is YES at the step 205, the block addresses at which the latest n pieces of record information are stored are obtained from the LRU circuit 30, and the record information of the alarm rank "1" is retrieved from the latest n pieces of record information stored at the block addresses obtained (step 211), and n and m are then reset to 0 (step 212). The process returns to the step 201 so as to transmit N' pieces of record information of an alarm rank "1" to the centralized monitor, and the processing at the steps 202 and thereafter is repeated.

Although the case of storing the record information on an alarm into the memory is explained in this embodiment, the record information stored into the memory is not restricted thereto but the present invention is applicable to the case of storing the record information on a general event.

The record information of a high rank is retrieved in the embodiment, but the record information retrieved is not restricted thereto and the present invention is applicable to the case of retrieving record information satisfying a predetermined condition.

In addition, although an FIFO memory is used as a vacant block controller in this embodiment, an LIFO (Last in First Out) memory may be used instead. The LIFO memory stores the address data in the order of reference, supplies the address data in the reverse order of storage, and designates the addresses for storing the record information on new events by the supplied address data.

As described above, a memory controlling apparatus of the present invention is provided with: a vacant address controller for serially storing the addresses where record information which is referred to has been stored in the order of reference, supplying the addresses in the order of storage, and designating the supplied addresses as the addresses for storing the record information on new events; and an LRU unit for storing the addresses of the memory at which record information is stored in the order of storage. When a new event occurs, if no address is designated by the vacant address controller, the address at which the oldest record information is stored is obtained from the LRU unit so as to store the record information on the new event at the address obtained and update the contents of memory of the LRU unit. On the other hand, if the address is designated by the vacant address controller, the record information on the new event is stored at the address and the contents of memory of the LRU unit are updated. According to this structure, it is possible to constantly hold the record information on the latest N events in the record information memory without the need for moving the record information upward every time a block becomes vacant as a result of reference of the record information stored therein.

According to the present invention, n addresses at which the record information referred to is stored are input to the vacant address controller and the LRU unit in the order of reference when the record information is referred to, and n is held as the number of pieces of record information an object of next retrieval. After n new events occur, 1 is added to the number n of the pieces of record information as the objects of retrieval (n+1→n) every time a new event occurs. At the time of retrieval of predetermined record information, the addresses of the n latest pieces of record information stored in the record information memory are obtained from the LRU unit so as to retrieve and refer to the record information which satisfies the predetermined condition from the n pieces of record information stored at the addresses. Thus, it is possible to retrieve the predetermined record information in a short time without the need for reference of all record information.

In addition, according to the present invention, it is possible to shorten the time for the record information storage process and the record information retrieval process, thereby enhancing the entire throughput.

As many apparently widely different embodiments of the present invention can be made without departing from the spirit and scope thereof, it is to be understood that the invention is not limited to the specific embodiment thereof except as defined in the appended claims.

What is claimed is:

1. A memory controlling apparatus for serially storing the record information on an event into a memory of a predetermined size, storing the record information on a new event at the address at which the oldest record information is stored when said memory becomes full, and storing the record information on a new event at an apparently vacant address where the record information which has proved to be unnecessary as a result of reference is stored, said memory controlling apparatus comprising:

a vacant address controller for storing the address data for specifying the vacant addresses where the record information which is referred to has been stored, supplying the address data in the order of storage, and designating the addresses for storing the record information on new events by the supplied address data;

an LRU means for serially storing an address data which specifies the address of said memory at which record information is stored, said address data being input every time said record information is stored there and, if the same address data as that stored in said LRU means is input, eliminating the latter and storing the input address data as the latest address data;

a control unit for obtaining the address at which the oldest record information is stored from said LRU means, if no address is designated by said vacant address controller when a new event occurs, and storing the record information on said new event at said address obtained, while storing said record information on said new event at the designated address when said address is designated by said vacant address controller.

a means for monitoring the number of pieces of record information as an object of retrieval which inputs the address data for specifying n number of addresses where said record information referred to is stored to said vacant address controller and said LRU means in the order of reference, holds the latest n as the number of pieces of record information as an object of next retrieval and adds 1 to the number n of the pieces of record information as the objects of retrieval every time a new event occurs after new n events have occurred; and a retrieving means for obtaining the addresses of the latest n pieces of record information in said memory from said LRU means, and retrieving the record information which satisfies a predetermined condition from said latest n pieces of record information.

2. A memory controlling apparatus according to claim 1, wherein said address controller includes a FIFO (First In First Out) means for storing address data in the order of reference, supplying said address data in the order of storage, and designating the addresses for storing the record information on new events by the supplied addresses.

3. A memory controlling apparatus according to claim 1, wherein said address controller includes a LIFO (Last In First Out) means for storing address data in the order of reference, supplying said address data in the reverse order of storage, and designating the addresses for storing the record information on new events by the supplied addresses.

4. A memory control method for serially storing the record information on an event into a memory of a predetermined size, and storing the record information on a new event at the address at which the oldest record information is stored when said memory becomes full, and storing the record information on a new event at an apparently vacant address where the record information which has proved to be unnecessary as a result of reference is stored, said memory control method comprising the steps of:

provinding a vacant address controller for serially storing address data for specifying the vacant addresses where the record information which is referred to has been stored in the order of reference, supplying the address data in the order of storage, and designating the addresses for storing the record information on new events by the supplied address data;

providing an LRU means for serially storing the address data which specifies address of said memory at which record information is stored, said address data being input every time said record information is stored there and, if the same address data as that stored in said LRU means is input, eliminating the latter and storing the input address data as the latest address data;

obtaining the address at which the oldest record information is stored from said LRU means if no address is designated by said vacant address controller when a new event occurs, and storing the record information on said new event at said address obtained, while storing said record information on said new event at the designated address when said address is designated by said vacant address controller;

inputting the address data for specifying n number of addresses where said record information referred to is stored to said vacant address controller and said LRU means in the order of reference, holding the latest n as the number of pieces of record information as an object of next retrieval, and adding 1 to the number n of the pieces of record information as the objects of retrieval every time a new event occurs after new n events have occurred; and obtaining the addresses of the latest n pieces of record information in said memory from said LRU means at the time of retrieval, and retrieving the record information which satisfies a predetermined condition from said latest n pieces of record information.

* * * * *